(12) United States Patent
Park et al.

(10) Patent No.: US 7,787,406 B2
(45) Date of Patent: Aug. 31, 2010

(54) METHODS AND ARRANGEMENTS FOR ADAPTIVELY CHANGING SNOOZING INTERVALS OF WIRELESS DEVICES

(75) Inventors: Minyoung Park, Portland, OR (US);
Tsai James, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 11/787,952

(22) Filed: Apr. 18, 2007

(65) Prior Publication Data

US 2008/0261663 A1   Oct. 23, 2008

(51) Int. Cl.
*G08C 17/00* (2006.01)

(52) U.S. Cl. .................. 370/311; 455/343.1; 455/343.2; 455/343.3; 455/343.4; 455/343.5; 455/572; 455/573; 455/574

(58) Field of Classification Search .................. 370/311; 455/572–574, 343.1, 343.5
See application file for complete search history.

(56) References Cited

U.S. PATENT DOCUMENTS

| | | | | |
|---|---|---|---|---|
| 6,192,230 B1 * | 2/2001 | van Bokhorst et al. | ... | 455/343.3 |
| 6,804,542 B1 * | 10/2004 | Haartsen | ...... | 455/574 |
| 6,829,493 B1 * | 12/2004 | Hunzinger | ........ | 455/574 |
| 7,295,827 B2 * | 11/2007 | Liu et al. | ........ | 455/343.2 |
| 7,433,670 B2 * | 10/2008 | Benveniste | ........ | 455/343.2 |
| 7,505,795 B1 * | 3/2009 | Lim et al. | ........ | 455/574 |
| 7,577,113 B2 * | 8/2009 | Alon et al. | ........ | 370/311 |
| 2005/0070340 A1 * | 3/2005 | Kim | ........ | 455/574 |
| 2007/0036096 A1 * | 2/2007 | Sinivaara | ........ | 370/318 |
| 2007/0211745 A1 * | 9/2007 | Deshpande et al. | ........ | 370/432 |
| 2007/0259673 A1 * | 11/2007 | Willars et al. | ........ | 455/453 |
| 2008/0130543 A1 * | 6/2008 | Singh et al. | ........ | 370/311 |

\* cited by examiner

*Primary Examiner*—Rafael Pérez-Gutiérrez
*Assistant Examiner*—Lameka J. Kirk
(74) *Attorney, Agent, or Firm*—Schubert Law Law Group, PLLC; Neil Cohen

(57) ABSTRACT

Methods and arrangements for wireless communications are described. Embodiments include transformations, code, state machines or other logic to adaptively change a snoozing interval of a station. The embodiments may also include determining a timeout (TO) period for a station, examining network traffic of the station after a period of network traffic inactivity not less than the TO period, and determining a snoozing interval, the length of the snoozing interval based upon the examination of the network traffic. The embodiments may also include adjusting the length of the TO period. In some further embodiments, examining network traffic may include determining categories of network traffic. In other further embodiments, examining network traffic may include determining a size of a queue of network traffic for the station. The embodiments may also include redetermining a snoozing interval after returning to a normal power mode.

16 Claims, 4 Drawing Sheets

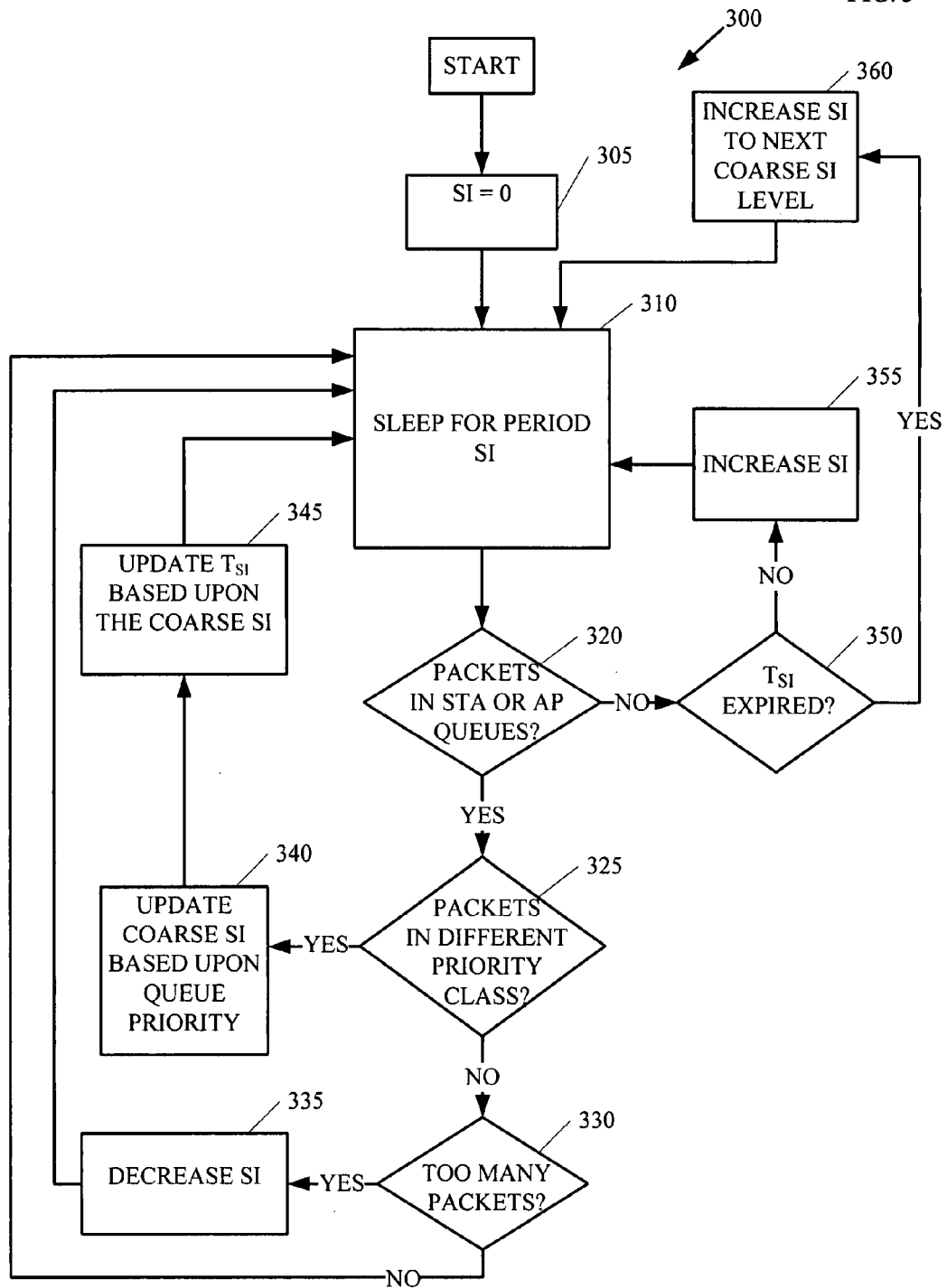

COARSE SNOOZING INTERVAL CONTROL

FINE SNOOZING INTERVAL CONTROL

METHODS AND ARRANGEMENTS FOR ADAPTIVELY CHANGING SNOOZING INTERVALS OF WIRELESS DEVICES

FIELD

The present invention is in the field of wireless communications. More particularly, embodiments are in the field of power management of wireless devices.

BRIEF DESCRIPTION OF THE DRAWINGS

Aspects of the invention will become apparent upon reading the following detailed description and upon reference to the accompanying drawings in which like references may indicate similar elements:

FIG. 3 is a flowchart of an embodiment of a method to adaptively change a snoozing interval of a station;

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Generally speaking, methods and arrangements for wireless communications are contemplated. Embodiments include transformations, code, state machines or other logic to adaptively change a snoozing interval of a station. The embodiments may also include determining a timeout (TO) period for a station, examining network traffic of the station after a period of network traffic inactivity not less than the TO period, and determining a snoozing interval, the length of the snoozing interval based upon the examination of the network traffic. The embodiments may also include adjusting the length of the TO period. In some further embodiments, examining network traffic may include determining categories of network traffic. In other further embodiments, examining network traffic may include determining a size of a queue of network traffic for the station. The embodiments may also include redetermining a snoozing interval after returning to a normal power mode. While specific embodiments will be described below with reference to particular circuit or logic configurations, those of skill in the art will realize that embodiments of the present invention may advantageously be implemented with other substantially equivalent configurations.

Figure 1:
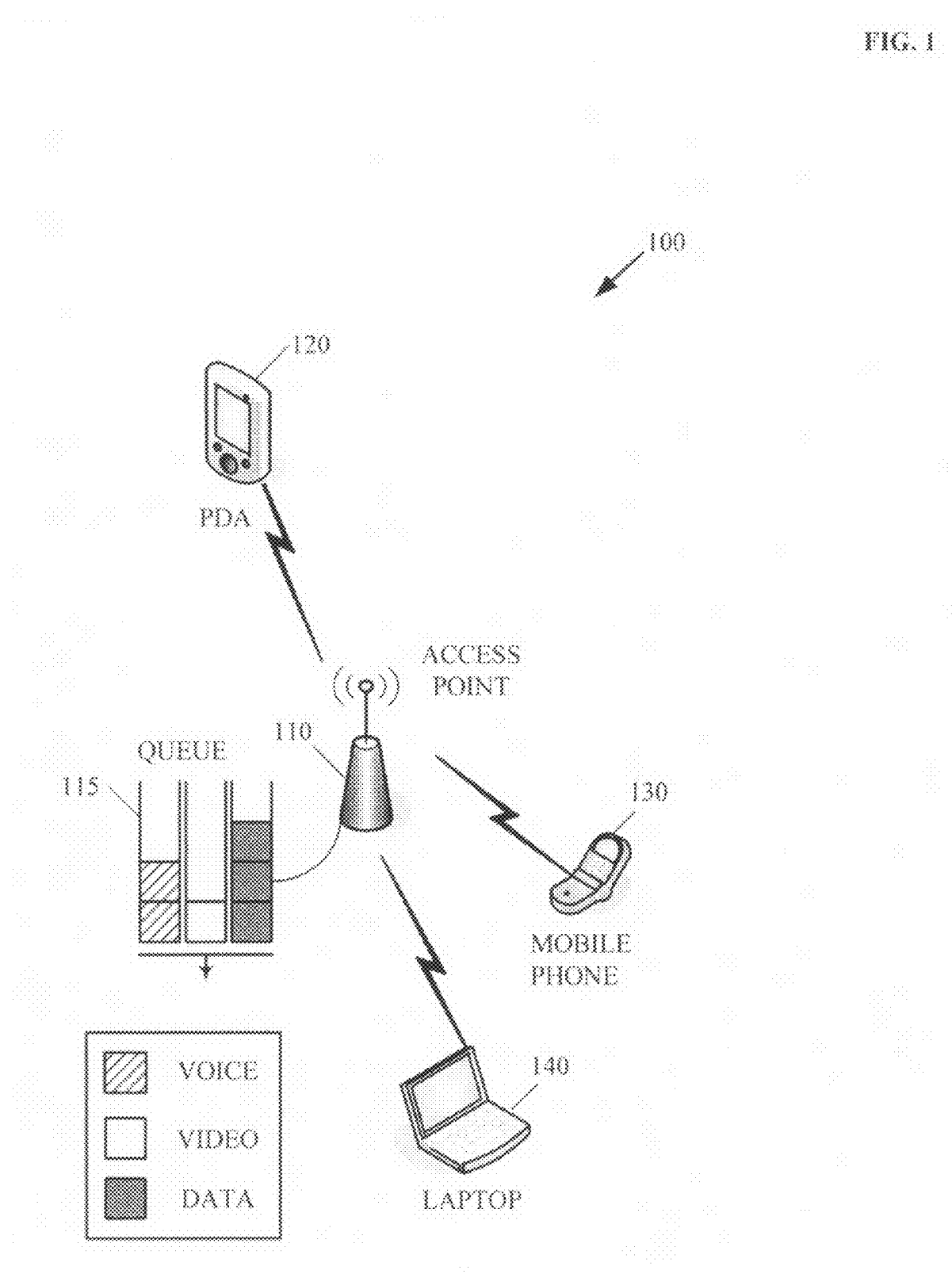
FIG. 1 is a diagram of an embodiment of a wireless network.

FIG. 1 is a diagram of an embodiment of a wireless network 100. The wireless network 100 includes access point 110 and wireless devices or stations PDA 120, mobile phone 130, and laptop 140. The access point 110 and wireless devices (120, 130, and 140) may transmit and receive messages by means of radio frequencies (RF). An RF transmitter may impress digital data onto an RF frequency for transmission of the data by electromagnetic radiation. The RF transmitter may, for instance, modulate a carrier wave. An RF receiver may receive electromagnetic energy at an RF frequency and extract the digital data. The RF receiver may, for example, demodulate the received radio waves. Messages sent across network 100 may be referred to as network traffic. Messages may be broken into several smaller units called packets, which may be sent across the network 100 and reassembled upon reception.

Access point 110 may communicate with each of the wireless devices 120, 130, and 140 and may relay messages from one of packets 120, 130, 140 to another. In some embodiments, access point 110 may comprise an access point for a wireless local area network (WLAN), operating according to the standards of IEEE 802.11. See the IEEE 802.11a standard, IEEE std. 802.11a-1999, published Feb. 11, 2000; the IEEE 802.11b standard, IEEE std. 802.11b-1999, published Feb. 11, 2000; the IEEE 802.11g standard, IEEE std. 802.11g-2003, published Oct. 20, 2003; and the IEEE 802.11n standard, IEEE std. 802.11n, published in draft form Feb. 7, 2007. Access point 110 includes queue 115. Queue 115 stores packets for transmission to the stations (120, 130, and 140), separating the voice, video, and data packets.

The stations (120, 130, and 140) may support modes of reduced power consumption (power-saving modes), during which they are not transmitting or receiving messages. The stations may enter into power-saving mode for a period (snoozing or sleep interval), awaken, and poll access point 110 for messages. The wireless devices of FIG. 1 may be battery operated. The ability of switching to power-saving mode (sleeping) may significantly increase battery life.

Network 100 may provide a quality of service (QoS) capability. It may assign access categories (AC) to various streams of packets and may give different degrees of priority to the categories. An AC may include a common set of enhanced distributed channel access (EDCA) parameters that may be used by a QoS function to contend for a channel in order to transmit packets with certain properties. In many embodiments, the hierarchy of AC's may include, in ascending order of priority, a low-delay conversational class for voice traffic, a constant delay streaming class for streaming video, a payload-preserving interactive class for web browsing, and a best-effort background class for e-mails and downloads.

In many current networks, power-savings mode may interfere with QOS. In many network architectures, the networks may not know when the next packets may arrive. Conventional implementations of power saving schemes in these networks may be coarse grained. The snooze intervals may be multiples of a beacon interval (100 ms)). These snoozing intervals may be longer than the permissible delay for some classes of packets. For instance, VoIP packets may be received every 20 ms to 30 ms.

In network 100, the stations (120, 130, and 140) may adaptively change their snoozing intervals based upon an examination of network traffic, thereby maintaining battery life while preserving QOS service. The changes may be based upon the classes of messages waiting in queue 115, the number of messages, the number of packets in a period of time, the inter-packet arrival time, or other measures of network traffic. The period of time may include a snoozing interval.

The wireless network 100 illustrated in FIG. 1 is for explanation, not for limitation. Systems for wireless communications useful according to various embodiments of the present invention may include additional wireless devices or may omit some of the wireless devices shown. Wireless devices included in a wireless network may include smart phones, pagers, e-mail appliances, special-purpose units for scanning, bar coding, and credit card reading, and other devices that may be known to those of skill in the art.

Other embodiments may communicate according to a variety of wireless protocols including NFC (Near Field Communications), WLAN (Wireless Local Area Network), WMAN (Wireless Metropolitan Area Network), WiMAX (Worldwide Interoperability for Microwave Access), 3.5-3G cellular, RAN (Radio Access Network), PAN (personal area network), 4G, RFID (Radio Frequency Identification), and other wireless protocols which may be known to those of skill in the art. IEEE standards 802.11a, 802.11b, 802.11g, or 802.11n may apply to WLAN networks. IEEE standard 802.16 may apply to WiMAX networks. Standard ECMA-368 may apply to PAN networks.

A variety of network architectures may be used in other embodiments. In many embodiments, access point 110 may be connected to a wireline network such as the Internet and may act as a bridge between the wireline network and the wireless devices. Wireless devices such as wireless device 140 may communicate over the wireline network by communicating with access point 110. Access point 110 may then relay the communications over the wireline network. In many embodiments, access point 110 may relay communications to other access points and receive communications from other access points. This relay of communications may enable mobile stations associated with the access point to communicate with mobile stations associated with the other access points. In a number of embodiments, a network system may include multiple access points and controllers which control their operations. The multiple access points may handle the physical reception and transmission, and the controllers may handle much of the administrative processing of the network system. In some other embodiments, base stations as defined in IEEE 802.16 and wireless devices other than access points may communicate with multiple end stations and may relay communications from one end station to another.

In many other embodiments, an access point or other device for relaying communications to end stations may maintain queues which are not segregated by class of service. All messages for an end station, of whatever nature, may be contained in a single queue for the end station.

Figure 2:
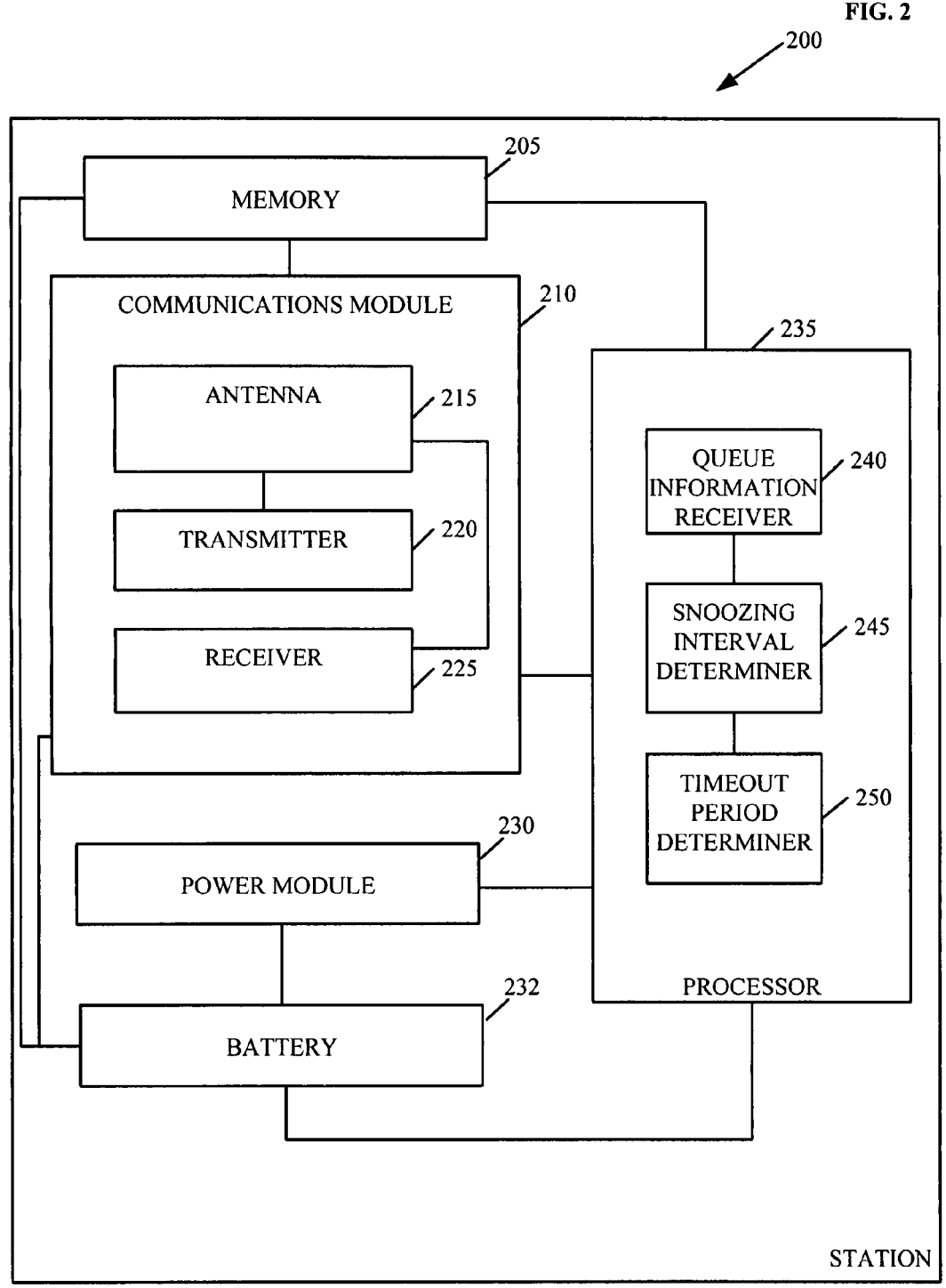
FIG. 2 is a diagram of an embodiment of an apparatus to adaptively change a snoozing interval.

Turning to FIG. 2, shown is a diagram of an embodiment of an apparatus to adaptively change a snoozing interval. Station 200 includes memory 205, a communications module 210, a power module 230, a battery 232, and a processor 235. Memory 205 may include random access memory and non-volatile memory such as a hard disk drive, optical disk drive, electrically erasable programmable read-only memory space (EEPROM or Flash memory) drives, or as any other kind of computer memory as will occur to those of skill in the art.

Communications module 210 includes antenna 215, transmitter 220, and receiver 225. Transmitter 220 may modulate information onto a carrier signal, amplify the signal, and broadcast the signal over the channel. Transmitter 220 may send messages to an access point or other intermediate node to check for messages queued for station 200 (poll the access point). Receiver 225 may take in the transmitted signal from the channel and process it to retrieve the information signal. Receiver 225 may attempt to discriminate the signal from other signals which may use the same channel, amplify the signal for processing, and demodulate or remove the carrier from the processed signal to retrieve the information that was sent. Transmitter 220 and receiver 225 may operate in power-saving mode. They may be turned off for short periods of time to conserve the power of battery 232. Communications module 210 may include an Intel wireless network adapter card such as the Intel® PRO/Wireless 3945ABG Network Connection or the Intel® PRO/Wireless 2915ABG Network Connection, which support protocols 802.11a, b, and g; or the Intel® PRO/Wireless 2200BG Network Connection, which supports protocols 802.11b and g.

Power module 230 may be able to switch station 200 into a power-savings mode and return from it in 10 ms. In the future, power-savings cycles of even smaller times may be possible. Station 200 may be able to provide QOS while conserving battery life by entering a power-savings mode for many short periods.

Processor 235 includes queue information receiver 240, snoozing interval determiner 245, and timeout period determiner 250. Queue information receiver 240 may receive information about the messages queued for station 200 in an access point such as access point 110 in FIG. 1. The information may consist of the numbers and classes of messages, the total number of messages, or simply whether the message queue is empty. Transmitter 240 may obtain information about the messages on queue by polling an access point.

Snoozing interval determiner 245 may determine the length of a snoozing interval for communications module 210. Snoozing interval determiner 245 may base the snoozing interval upon the information about network traffic for station 200 contained in queue information receiver 240.

Timeout period determiner 250 may determine the length of a timeout period for communications module 210. A timeout period is a period of inactivity after which a snoozing interval may be redetermined. Timeout period determiner 250 may base the timeout period upon the information about network traffic for station 200 contained in queue information receiver 240.

The station 200 illustrated in FIG. 2 is for explanation, not for limitation. Some embodiments may include a filter that smoothes the number of received packets so that the calculated snoozing interval does not change due to impulsive changes in the number of received packets.

FIG. 3 depicts a flowchart 300 of an embodiment of a method to adaptively change a snoozing interval of a station, such as station 200 depicted in FIG. 2. In the method of flowchart 300 of FIG. 3, the adaptive change of a snoozing interval may proceed in two stages, a coarse setting which produces a coarse snoozing interval and a fine adjustment. The coarse snoozing interval may be set after the expiration of each timeout period and whenever the station wakes up and finds queued packets of a different access class than the access class corresponding to the current coarse snooze setting. The coarse snoozing intervals may be fixed and based upon the classes of network traffic. For example, in many embodiments, the classes may consist of voice, video, best effort, and background. Corresponding to these classes, there may be five coarse snoozing intervals; one for each class and an initial coarse snoozing interval, SI0, of duration 0 ms. The coarse snoozing interval for a class of traffic may be designed to allow meeting quality of service requirements for the traffic while maximizing sleep periods. In some embodiments, the value of SI1, the coarse snoozing interval for voice traffic may be 20 ms, and the value of SI2, the coarse snoozing interval for video traffic, may be 30 ms. The value of SI3, the coarse snoozing interval for best effort, may be a value larger than 30 ms that provides adequate service.

The value of SI4 may be relatively large compared to the other intervals, even as large as 1200 ms. The limitations on SI4 may be based on considerations other than missing network traffic. One consideration is scanning. If SI4 is larger than the scan interval, a station may wake up solely to do the scanning, but not otherwise to process network traffic. Another consideration is listening for DTIM, a special packet from the access point that tells whether a broadcast or monocasting packet is in the access point. To avoid missing the DTIM, a station may try to wake up at the time of a DTIM broadcast. Usually, DTIM occurs at some multiple of 100 ms, such as 400 ms. In that case, SI4 may be set to 400 ms or the interval until the next DTIM.

For each SI class, there may be a corresponding timeout period. The timeout periods are designed to be increasing: TSI0<TSI1<TSI2<TSI3< . . . A long timeout period may correspond to a long coarse snoozing interval, and a short timeout period may correspond to a short coarse snoozing interval.

Fine adjustments to the snoozing interval may be made each time the station awakens from power saving mode. The adjustment may be based on the amount of network traffic. Ideally, the snoozing intervals may be set so that the station awakens exactly long enough to keep up with traffic, but no longer.

The method of flowchart 300 may include setting the snoozing interval (SI) to 0 (element 305). A station sleeping for a snoozing interval of 0 may cycle into power savings mode and immediately cycle back to a normal operational state. A snoozing interval of 0 on station power-up or reboot may force the station to process messages rather than immediately going to sleep. The method of flowchart 300 includes the shifting into power-saving mode for the snoozing interval SI (element 310). On awakening, the station may check for packets queued for transmission by the station or packets in the queue of an access point held for the station (element 320).

If there are no packets, the station may check whether the timeout period $T_{SI}$ has expired (element 350). If the timeout period $T_{SI}$ has not expired, the snoozing interval SI is increased (element 355) with a fine adjustment. The absence of a packet in a queue suggests that the communications module may sleep longer the next time, while still keeping up with network traffic. Similarly, if the timeout period $T_{SI}$ has expired, the snoozing interval SI may be increased to the next higher coarse setting (element 360). The timeout period may also be updated, based upon the coarse snoozing interval.

If there are packets queued for the station, the station checks if they are in a different access class than the class corresponding to the present setting of the coarse snoozing interval (element 325). If so, the coarse snoozing interval may be updated based upon the class of packets in the queue (element 340). The time out interval is also adjusted, based upon the coarse snoozing interval and the class of traffic (element 345).

Returning to element 325, if the packets in the queue are of the priority class used to set the current coarse snoozing interval, the station checks if there are too many packets (element 330). There are too many packets if the wireless apparatus is not keeping up with network traffic. In many embodiments, the presence of more than one packet in the queue may indicate the wireless apparatus is not keeping up with network traffic. If so, SI is reduced (element 335). The smaller snoozing interval better enables the WD to keep with network traffic. If there are not too many packets in the queue, the snoozing interval is not adjusted in this cycle. It is satisfactorily keeping up with traffic.

After all of the adjustments to the snoozing interval and the timeout interval, the WD again goes to sleep for the current snoozing interval (element 310). In FIG. 3, the method of modifying the snoozing interval is shown as a never-ending loop. It may continue until the station is powered down or rebooted.

Figure 4A:
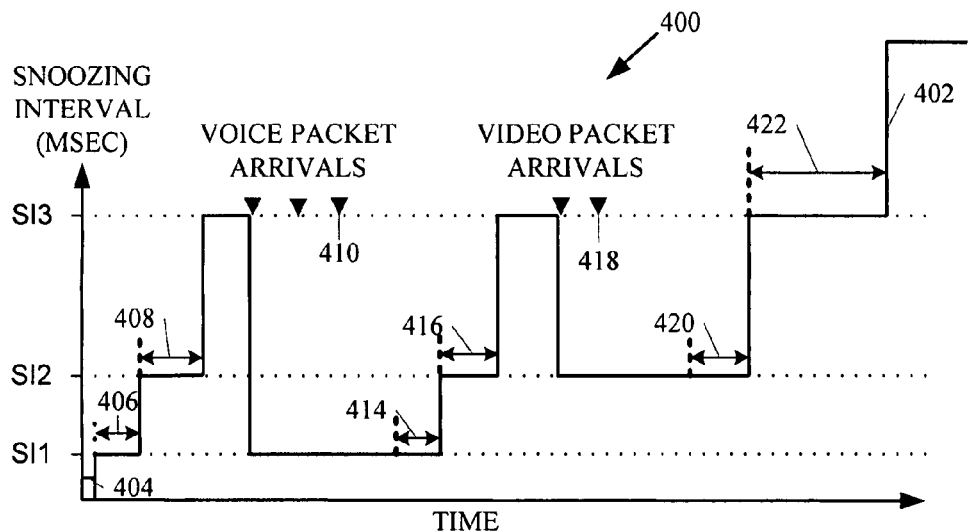
FIG. 4A is an exemplary graph depicting coarse snoozing interval control.
Figure 4B:
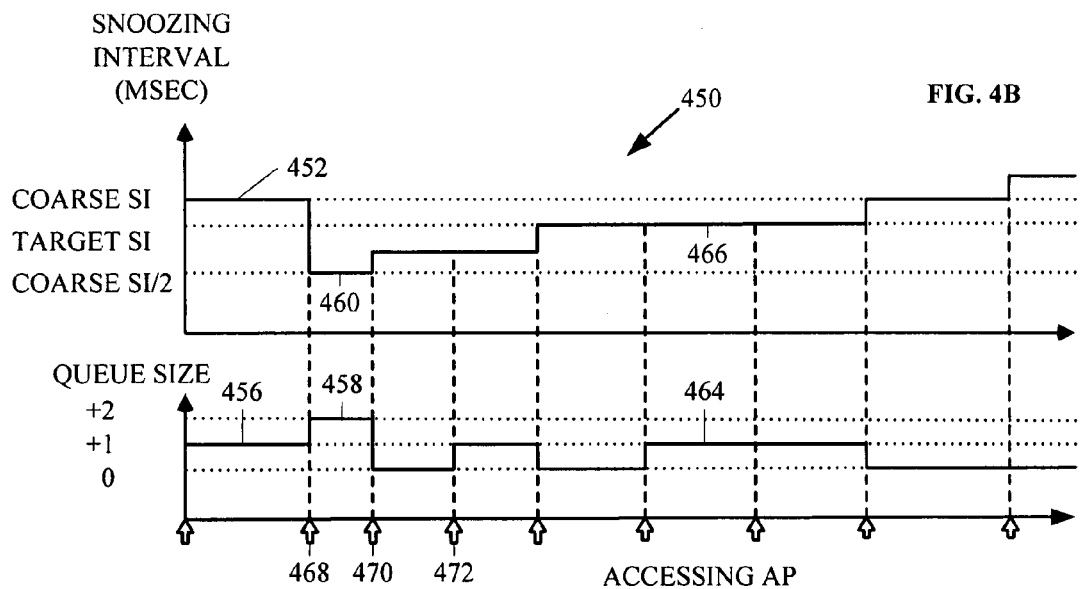
FIG. 4B is an exemplary graph depicting fine snoozing interval control.

Turning to FIGS. 4A and 4B, presented are graphs 400 and 450 showing the adaptive change of a snoozing interval of a station in more detail. In graphs 400 and 450, the horizontal axis represents time and the vertical axis represents the snoozing interval. FIG. 4A depicts the coarse snoozing interval control. In graph 400, the initial snoozing interval, SI0, is zero. The station, therefore, will not sleep. The corresponding timeout period, T0, is represented by the short interval 404. Since there is no communication activity during the timeout period T0, the coarse snoozing interval is increased to SI1 and the timeout period is increased to T1, represented by the double arrow 406. Again, there is no traffic during T1, and the coarse snoozing interval is increased to the next level of snoozing interval, SI2, and the timeout period is increased to T2, represented by the double arrow 408. Similarly, there is no network activity in the timeout periods represented by the double arrows 414, 416, 420, and 422. After the expiration of these timeout periods, the coarse snoozing intervals and corresponding timeout periods increase. Similar increases in the coarse snoozing interval were performed in element 360 of FIG. 3.

Conversely, when the station wakes up and sees packets in the station or access point queues, it may choose an appropriate coarse SI based on the queue information. For example, the voice packets 410 arrive when the coarse snoozing interval of the station is SI3. The snoozing interval is decreased to SI1. Similarly, when the station detects the arrival of video packets 418, it decreases the coarse snoozing interval to SI2. Similar changes in the coarse snoozing interval were performed in element 340 of FIG. 3.

FIG. 4B depicts fine snoozing interval control, in which the coarse snoozing interval is adjusted for the length of the queue. The fine snoozing interval control algorithm may enable fine tuning the coarse snoozing interval to a snoozing interval which lets the station keep up with traffic while maximizing the idleness of the station. In the upper section of graph 450, line 452 represents the values of the snoozing interval over time. The horizontal portions of line 452 represent periods of sleeping and the vertical portions represent adjusting the snoozing interval on awakening. In the lower section of graph 450, line 456 represents the size of the queue over time. The arrows at the bottom of the lower section of graph 450, such as arrows 468 and 470, represent the station accessing the access point to determine the length of the queue. The station may poll the access point by sending data packets for transmission. If there is no packet to send, the station may send a null packet. Upon receipt of the packet from the station, the access point will send the stored packets to the station with the queue size information.

In the example of graph 450, each time the station awakens after sleeping for a snoozing interval, the station checks the length of the queue and adjusts the snoozing interval. If the queue is zero, the snoozing interval may be increased, because the station awoke earlier than needed to process network traffic. If the queue is the expected size (one in the example of FIG. 4B), the snoozing interval may remain unchanged. Finally, if the size of the queue is greater than one, the station may reduce the snoozing period to reduce the number of queued messages on awakening.

In graph 450, the snoozing interval is initially set for the coarse SI. The station sleeps for the coarse SI. On awakening, it accesses the access point at point 468. In the example of graph 450, the queue size is two packets. Accordingly, the station reduces the coarse SI, to half of its previous value in the example of graph 450. The station may sleep for the adjusted SI and access the access point at 470. In the example of graph 450, the queue size is zero at that time. In this case, the station increases its snoozing interval by delta, which may be a fixed fraction of the coarse snoozing interval. After sleeping for the adjusted snoozing interval, the station awakens and accesses the access point at 472. Now, the queue has the right number of packets (e.g. one packet for this example), and the station does not change its snoozing interval. The snoozing interval may remain unchanged for several sleep cycles. For example, segment 466 of line 452 represents a period of stability in the snoozing interval. The queue size remains at one on awakening, as indicated by segment 464 of line 456.

The methods of FIGS. 3, FIG. 4A and FIG. 4B may enable a station to meet QOS requirements in processing network traffic while conserving battery power. By using a fine-grained snoozing interval and adaptively changing the snoozing interval based on the traffic information, the methods may save power for any kind of traffic flows while satisfying quality of service requirements. In addition, the methods may rely on traffic information which may be acquired in a relatively simple way. The methods base the snoozing intervals on queue characteristics such as the priority and size of the queues. In contrast, conventional power saving schemes may use complicated algorithms that analyze each packet and compile statistical information. Further, the methods are decoupled with the applications in the higher software stack. Unlike some conventional power saving approaches such as WiFi Multimedia (WMM) power saving, the methods of FIGS. 3, FIG. 4A and FIG. 4B may not require information from the applications.

The elements of FIG. 3, FIG. 4A and FIG. 4B are for illustration and not limitation. In the example of FIG. 4B, the snoozing interval is adjusted to attempt to have one packet in the queue on awakening (right number of packets). If the queue is larger, the snoozing interval is halved. If the queue is smaller (empty), the snoozing interval is increased by a fixed fraction of the original coarse snoozing interval. In some other embodiments, the right number may be a greater number than one. In many other embodiments, a different algorithm for adjusting the snoozing interval may be applied. In some further embodiments, the change in snoozing interval may also be based upon the number of consecutive awake cycles in which the queue was proper size. The greater the number, the smaller the adjustment. The rationale is that the snoozing period was approximately the right amount to keep up with traffic, and a relatively smaller adjustment may be needed. One such algorithm is as follows:

```
Step 1:  m=0, SI = initial_SI    ; m is number of consecutive
                                 ; awakenings with proper queue size
Step 2:  Sleep for SI
Step 3:  Wake up and access AP (access point) for queue size
Step 4:  IF  STA received one packet from AP     ; no change
             increase m by 1
             goto Step 2
         else if STA received n packets from AP, n > 1   ; decrease SI
             if m is equal to 0
                 SI = SI/n
             else
                 SI = m/ (1+m) × SI
             endif
             m = 0
             go to Step 2
         else if STA received 0 packets from AP     ; increase SI
             if m is equal to 0
                 SI = SI + ΔSI                       ; may be 1 ms
             else
                 SI = (1 + 1/m) × SI
             endif
             m=0
             if SI > DTIM
                 SI = DTIM
             go to Step 2
```

In the above algorithm, SI is the snoozing interval, and m is the number of consecutive cycles where the station awoke to find the right number of packets awaiting in the queue. Initially, m is set to 0 and SI is set to an initial value, which may be the coarse sleep interval. The station sleeps for the sleep interval SI, awakens, and checks the queue. There are three possibilities. If the queue has the right size, one element, the sleep interval remains the same and m is increased by one, reflecting one more cycle with the right size sleep interval. If the queue has zero elements, the sleep interval is increased. If m is positive, the sleep interval is increased by 1/m. Otherwise, the sleep interval is increased by delta, which may be set to one ms. If the sleep interval is greater than the time until the next DTIM broadcast, the sleep interval is reduced to that time. Finally, if the queue has two or more elements, the sleep interval is divided by the number of elements if m equals 0. If m is non-zero, the sleep interval is reduced by 1/(m+1).

In a variation of the above algorithm, the sleep interval may be increased by a fraction of delta when the queue is empty and decreased by a fraction of delta when the queue is too large. Specifically, the following changes are made:

| line 10: | SI=SI−1/ (m+1) ΔSI | ; ΔSI may be 1ms |
|---|---|---|
| line 19: | SI=SI+1/ (m+1) ΔSI | ; ΔSI may be 1ms |

In FIGS. 3, 4A, and 4B, the access class of the packets was known. In other embodiments, adaptive changing of the snoozing intervals may be based upon other information. If the total queue size is known, but not the access classes of the packets, then the coarse snoozing interval may be based upon the total queue. For instance, the snoozing interval may be increased when the queue is empty, and may be decreased when the queue is larger. If the queue size is not known, the snoozing interval may be based upon inter-packet arrival time. In some embodiments, for example, the snoozing interval may be set to the average inter-packet arrival time. In other embodiments, the snoozing interval may be set to a shorter interval in order to provide fast service to packets in high-priority access classes.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

It will be apparent to those skilled in the art having the benefit of this disclosure that the present invention contemplates methods and arrangements for adaptively changing snoozing intervals of wireless devices. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining a plurality of power-saving modes for a station, each power-saving mode comprising a snoozing interval and a timeout (TO) period;
   selecting a power-saving mode of the power-saving modes for the station based upon a class of network traffic;
   determining a class of network traffic of the station after awakening from a snoozing interval of the power-saving mode; and
   determining a snoozing interval, the length of the snoozing interval based upon the determining; the determining a snoozing interval comprising:
      switching to another power-saving mode with a larger snoozing interval and a larger TO period than the power-saving mode based upon determining that the TO period of the power-saving mode has expired without any network traffic activity of the station;
      switching to another power-saving mode based upon the class of network traffic after the awakening differing from the class of network traffic of the power-saving mode; and
      remaining in the power-saving mode, the remaining comprising modifying the snoozing interval of the power-saving mode but retaining the TO period of the power saving mode, the remaining based upon determining that the class of network traffic after the awakening is the same as the class of the power-saving mode.

2. The method of claim 1, wherein:
   the remaining comprises determining a size of a queue of network traffic for the station; and
   modifying the snoozing interval of the power-saving mode comprises determining a snoozing interval based upon the size of the queue.

3. The method of claim 1, wherein determining a class of network traffic comprises determining an interpacket arrival time.

4. The method of claim 1 wherein determining a class of network traffic comprises determining an access class of network traffic.

5. A method comprising:
   determining a timeout (TO) period for a station;
   examining network traffic of the station after a period of network traffic inactivity not less than the TO period, the examining comprising determining a number of packets received in a period of time;
   determining a snoozing interval, the length of the snoozing interval based upon the examining;
   selecting a target number of entries in a queue of network traffic for the station;
   determining a number of entries in the queue after returning from a power saving mode to a normal power mode; and
   adjusting the snoozing interval, the adjusting comprising:
      increasing the snoozing interval if the determined number of entries is zero;
      leaving the snoozing interval unchanged if the determined number of entries equals the target number of entries; and
      decreasing the snoozing interval if the determined number of entries is greater than the target number of entries.

6. The method of claim 5, wherein:
   increasing the snoozing interval comprises increasing the snoozing interval by a fixed amount; and decreasing the snoozing interval comprises halving the snoozing interval.

7. The method of claim 5, wherein:
the method further comprises determining the number m of consecutive times of awakening after a snoozing interval with the target number of elements equal to the determined number of entries;
increasing the snoozing interval comprises applying the formula:

$$SI = \left(1 + \frac{1}{m}\right)SI$$

where SI is the length of the snoozing interval and m is greater than 0; and
decreasing the snoozing interval comprises applying the formula:

$$SI = \left(\frac{m}{1+m}\right)SI$$

where m is greater than 0.

8. The method of claim 5, wherein:
the method further comprises determining the number m of consecutive times of awakening after a snoozing interval with the target number of elements in the queue;
increasing the snoozing interval comprises applying the formula:

$$SI = SI + \left(\frac{1}{(m+1)}\right)\Delta SI;$$

and
decreasing the snoozing interval comprises applying the formula:

$$SI = SI - \left(\frac{1}{(m+1)}\right)\Delta SI;$$

where SI is the length of the snoozing interval, $\Delta SI$ is a fraction of the snoozing interval, and m is greater than 0.

9. An apparatus for wireless communications, the apparatus comprising:
a communications module to process network traffic;
a processor, responsive to the communications module, comprising:
a timeout interval determiner to determine a timeout (TO) period;
a queue information receiver to examine network traffic after awakening from a snoozing interval of a power-saving mode, the examination to comprise the determination of a class of network traffic; and
a power-saving mode determiner to determine a plurality of power-saving modes, each power-saving mode based upon a class of network traffic, each power-saving mode comprising a snoozing interval, and a timeout (TO) period, wherein: the power-saving mode determiner comprises a snoozing interval determiner to determine a snoozing interval, the length of the snoozing interval based upon the class of network traffic, the snoozing interval determiner to:

select a power-saving mode with a larger snoozing interval and a larger TO period than a current power-saving mode based upon determining that the TO period of the current power-saving mode has expired without any network traffic activity of the station;
select a different power-saving mode than a current power-saving mode based upon determining that network traffic is of a class different from the class of the current power-saving mode; and
select the current power-saving mode, the selecting comprising modifying the snoozing interval of the power-saving mode but retaining the TO period of the power saving mode, the selecting based upon determining that the class of network traffic is of the class of the current power-saving mode; and
a power module, responsive to the snoozing interval determiner, to place the apparatus in a power-saving mode and to return the apparatus from the power-saving mode.

10. The apparatus of claim 9, wherein the snoozing interval determiner comprises a queue size adjuster to determine a snoozing interval based upon a size of a queue of network traffic for the apparatus.

11. The apparatus of claim 10, wherein:
the queue information receiver is to examine the network traffic after a return to a normal power mode from a power saving mode; and
the snoozing interval determiner is to determine a snoozing interval after the return, the determination of the snoozing interval to be based upon the examination of the network traffic after the return.

12. The apparatus of claim 9, wherein:
the processor comprises a filter to smooth a count of the number of received packets; and
the snoozing interval, responsive to the filter, is to moderate adjustments to the snoozing interval.

13. The apparatus of claim 9, wherein the snoozing interval determiner comprises a module to determine a snoozing interval based upon an interpacket arrival time.

14. An apparatus for wireless communications, the apparatus comprising:
a communications module to process network traffic; and
a processor, responsive to the communications module, comprising:
a timeout interval determiner to determine a timeout (TO) period;
a queue information receiver to examine network traffic after a period of network traffic inactivity not less than the TO period, the examination to comprise the determination of a number of packets received in a period of time; and
a snoozing interval determiner to determine a snoozing interval, the length of the snoozing interval based upon the examination of the network traffic, the snoozing interval determiner comprising a queue size adjuster to determine a snoozing interval based upon a size of a queue of network traffic for the apparatus, wherein the queue size adjuster is to:
select a target number of entries in a queue of network traffic for the station;
determine a number of entries in the queue after returning from a power savings mode to a normal power mode; and
adjust the snoozing interval, the adjusting comprising:
increasing the snoozing interval if the determined number of entries is zero;

leaving the snoozing interval unchanged if the determined number of entries equals the target number of entries; and decreasing the snoozing interval if the determined number of entries is greater than the target number of entries; and a power module, responsive to the snoozing interval determiner, to place the apparatus in a power-savings mode and to return the apparatus from the power-savings mode.

15. The apparatus of claim 14, wherein:

increasing the snoozing interval comprises increasing the snoozing interval by a fixed amount; and decreasing the snoozing interval comprises halving the snoozing interval.

16. The apparatus of claim 14, wherein:

the queue size adjuster is to determine the number m of consecutive times of awakening after a snoozing interval with the target number of elements equal to the determined number of entries;

increasing the snoozing interval comprises applying the formula:

$$SI = \left(1 + \frac{1}{m}\right)SI$$

where SI is the length of the snoozing interval and m is greater than 0; and decreasing the snoozing interval comprises applying the formula:

$$SI = \left(\frac{m}{1+m}\right)SI$$

where m is greater than 0.

* * * * *